(12) United States Patent
Frankel et al.

(10) Patent No.: US 8,376,325 B2
(45) Date of Patent: Feb. 19, 2013

(54) DIFFUSER MEMBRANES WITH MODIFIED ELECTRICAL PROPERTIES

(76) Inventors: Thomas E. Frankel, Poughkeepsie, NY (US); Seoungil Kang, Poughkeepsie, NY (US); Todd D. Ritter, Poughkeepsie, NY (US)

( * ) Notice: Subject to any disclaimer, the term of this patent is extended or adjusted under 35 U.S.C. 154(b) by 474 days.

(21) Appl. No.: 12/705,990

(22) Filed: Feb. 16, 2010

(65) Prior Publication Data

US 2011/0198763 A1    Aug. 18, 2011

(51) Int. Cl.
*B01F 3/04* (2006.01)
(52) U.S. Cl. .................................... 261/122.1
(58) Field of Classification Search ...... 96/4; 261/122.1
See application file for complete search history.

(56) References Cited

U.S. PATENT DOCUMENTS

| | | |
|---|---|---|
| 2003/0071377 A1 | 4/2003 | Tharp |
| 2003/0104192 A1 | 6/2003 | Hester et al. |
| 2007/0001323 A1 | 1/2007 | Kang |
| 2007/0028767 A1 | 2/2007 | Choi et al. |
| 2007/0128394 A1 | 6/2007 | Frankel et al. |
| 2008/0003405 A1 | 1/2008 | Tharp |
| 2009/0205116 A1 | 8/2009 | Stone et al. |
| 2010/0032851 A1 | 2/2010 | Frankel et al. |

FOREIGN PATENT DOCUMENTS

WO    2006127946 A2    11/2006

OTHER PUBLICATIONS

Rosso et al., "Time-Variations of Transfer Efficiency and Headloss for Fine-Pore Membrane . . . ," WEFTEC 2007, 2007,pp. 7944-7958 Water Environment Federation, US.
Frey et al., "Clogging and Cleaning of Fine-pore Membrane Diffusers," Water Science and Technology, 2004, pp. 69-77, vol. 50, No. 7, IWA Publishing, US.

*Primary Examiner* — Robert A Hopkins
(74) *Attorney, Agent, or Firm* — Law Offices of Michael L. Wise, LLC

(57) ABSTRACT

A diffuser membrane for use in a wastewater treatment application comprises an additive or coating operative to substantially reduce the ability of at least a portion of the diffuser membrane to buildup static charge. Aeration efficiency and contamination resistance are thereby improved.

13 Claims, 3 Drawing Sheets

DIFFUSER MEMBRANES WITH MODIFIED ELECTRICAL PROPERTIES

FIELD OF THE INVENTION

The present invention relates generally to equipment for wastewater treatment, and, more particularly, to flexible diffuser membranes with modified electrical properties including static charge properties that enhance aeration efficiency and contamination resistance.

BACKGROUND OF THE INVENTION

Flexible diffusers are conventionally used to support aerobic biological processes in wastewater treatment plants. A flexible diffuser typically comprises a disc-, tube-, or strip-shaped membrane that is constructed of rubber or other similar materials, which is punctured to provide a number of perforations in the form of holes or slits. In operation, pressurized air is sent through these perforations to create a plume of small bubbles. The bubbles, in turn, rise through the wastewater and, in doing so, provide the surrounding wastewater with the oxygen needed to sustain the desired biological processes occurring therein.

FIG. 1 shows a front perspective view of a partially cut-away fine bubble diffuser unit 100 that might be used in a wastewater treatment facility. Wastewater treatment with such units is described in, as just one example, F. L. Burton, *Wastewater Engineering* (McGraw-Hill College, 2002), which is hereby incorporated by reference herein. In the diffuser unit, a flexible diffuser membrane 110 sits atop a diffuser body 120. The diffuser body comprises a threaded connector 130, an air inlet orifice 140, and a receiving surface 150 for coupling to a retainer ring 160. The retainer ring holds the flexible diffuser membrane against the diffuser body. When gas is applied to the flexible diffuser membrane through the air inlet orifice, the gas pressure expands the membrane away from the diffuser body and causes the membrane's perforations to open so that the gas discharges through them in the form of fine bubbles. When the gas pressure is relieved, the membrane collapses on the diffuser body to close the perforations and prevent the liquid from entering the diffuser body in the opposite direction. Generally, a flexible diffuser membrane configured in this way produces bubbles smaller than five millimeters in diameter. The resultant large ratio of surface area to volume in these bubbles promotes efficient oxygen mass transfer between the bubbles and the surrounding wastewater.

Although flexible diffuser membranes are advantageous in many respects and have achieved widespread acceptance in a variety of gas diffusion applications, they are not wholly free of problems. In a wastewater treatment application, materials in the wastewater can become deposited on and build up on the membrane to clog or partially clog the perforations. For example, fats, greases, and other organic substances which are commonly found in wastewater can adhere to the membrane causing fouling. Calcium and calcium compounds such as calcium carbonate and calcium sulfate as well as other inorganic substances are especially problematic when they precipitate and build up on the diffuser membrane causing scaling. Such membrane contamination reduces the efficiency of the aeration system by requiring that the air source work harder to overcome the added flow resistance (i.e., head loss) at the membrane-wastewater interfaces. In addition, efficiency is further impacted because the bubbles typically become larger and the plumes of bubbles become less spatially uniform.

Several attempts have been made to mitigate these problematic aspects of flexible diffuser membranes. U.S. Patent Publication Nos. 2007/0001323 to Kang et al., and 2007/0128394 to Frankel et al., as well as U.S. patent application Ser. No. 12/221,809 to Frankel et al (all three hereby incorporated reference herein), for example, teach the use of fluoroelastomer- and polytetrafluoroethylene-containing coatings along with fluorine-based surface conversions which help to slow the contamination of diffuser membranes. However, while these efforts have had some success at increasing the useful life of diffuser membranes in wastewater treatment applications, even greater improvements to the aeration efficiency and contamination resistance of diffuser membranes remain desirable.

SUMMARY OF THE INVENTION

Embodiments of the present invention address the above-identified need by providing diffuser membranes with modified electrostatic and charge transfer characteristics. Advantageously, these modifications improve aeration efficiency as well as contamination resistance in wastewater applications.

In accordance with aspects of the invention, a diffuser membrane for use in a wastewater treatment application comprises an additive or coating operative to substantially reduce the ability of at least a portion of the diffuser membrane to buildup static charge. For example, a diffuser membrane in accordance with a first embodiment of the invention accomplishes the above-described goals by comprising an antistatic additive that acts to increase the electrical conductivity of the diffuser membrane and, thereby, acts to reduce the ability of the diffuser membrane to buildup static charge. Similarly, a diffuser membrane in accordance with a second embodiment of the invention produces the same effects by comprising an antistatic coating instead of a bulk additive

BRIEF DESCRIPTION OF THE DRAWINGS

These and other features, aspects, and advantages of the present invention will become better understood with regard to the following description, claims, and accompanying drawings where:

DETAILED DESCRIPTION OF THE INVENTION

Figure 1:
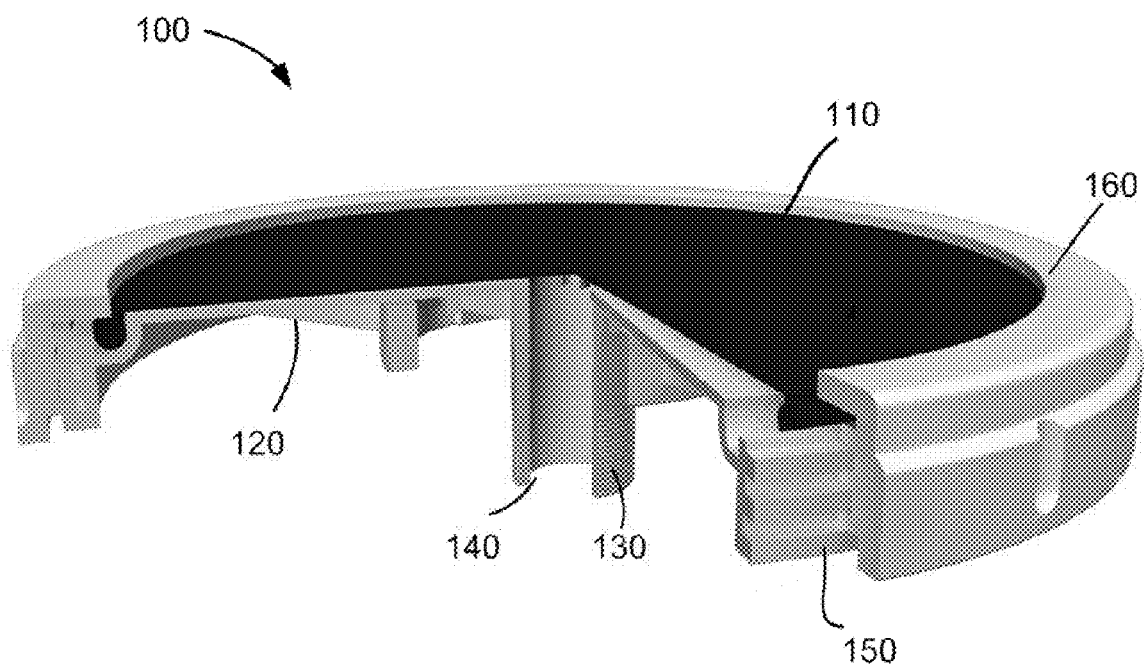
FIG. 1 shows a front perspective view of a conventional fine bubble diffuser unit with the diffuser unit partially cut away.
Figure 2:
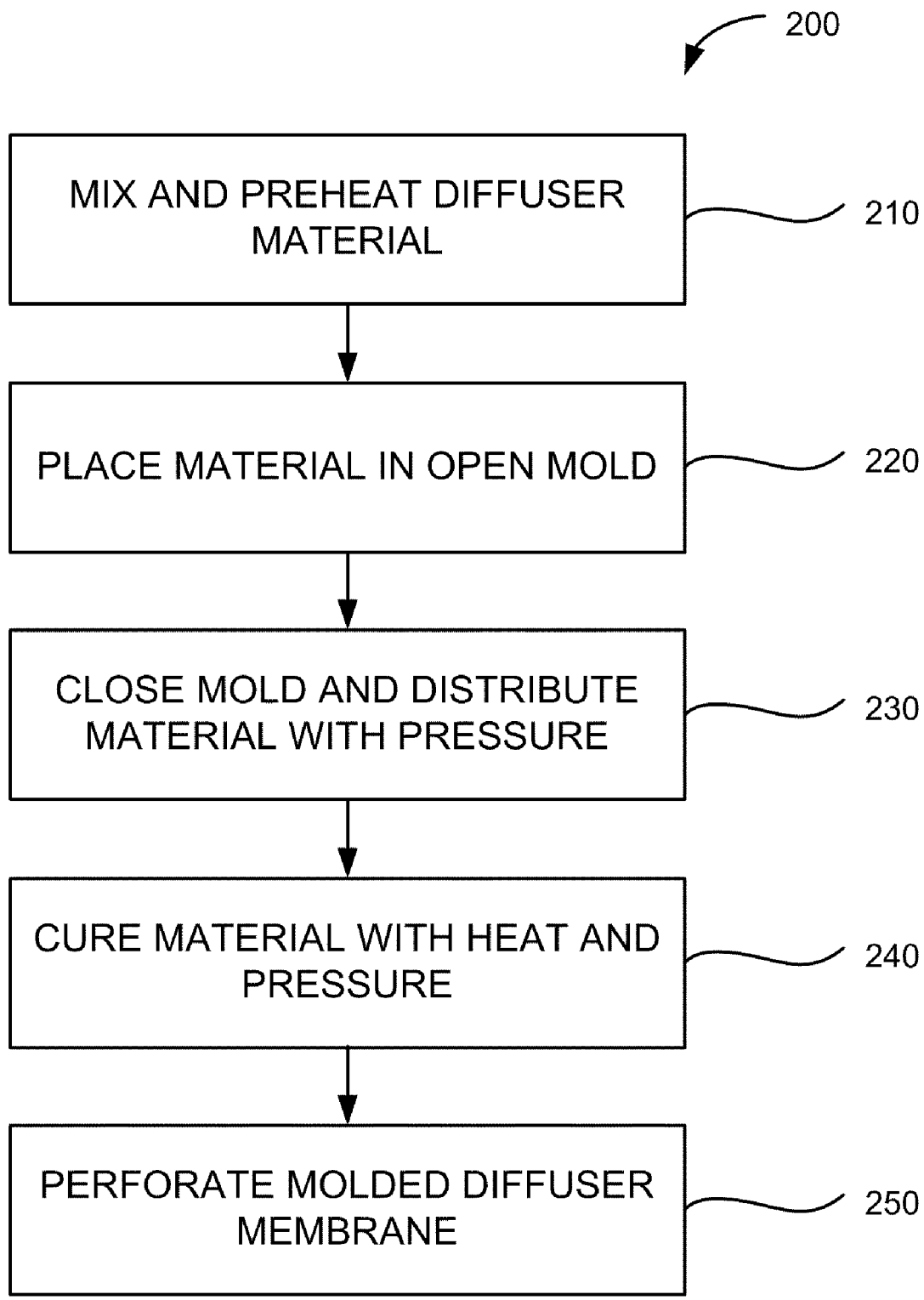
FIG. 2 shows a block diagram of an exemplary process for forming a diffuser membrane by compression molding and perforation.
Figure 3:
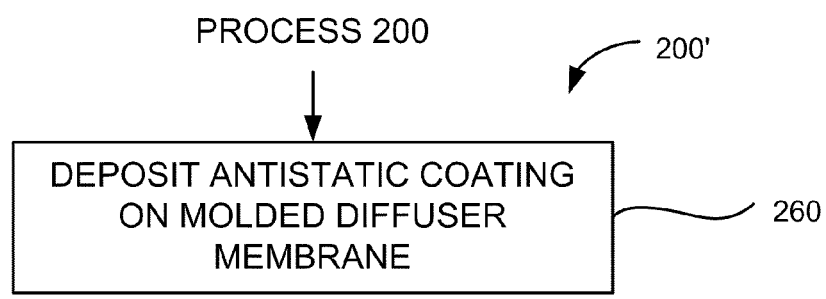
FIG. 3 shows a block diagram of an exemplary process for forming a diffuser membrane with an antistatic coating.
Figure 4:
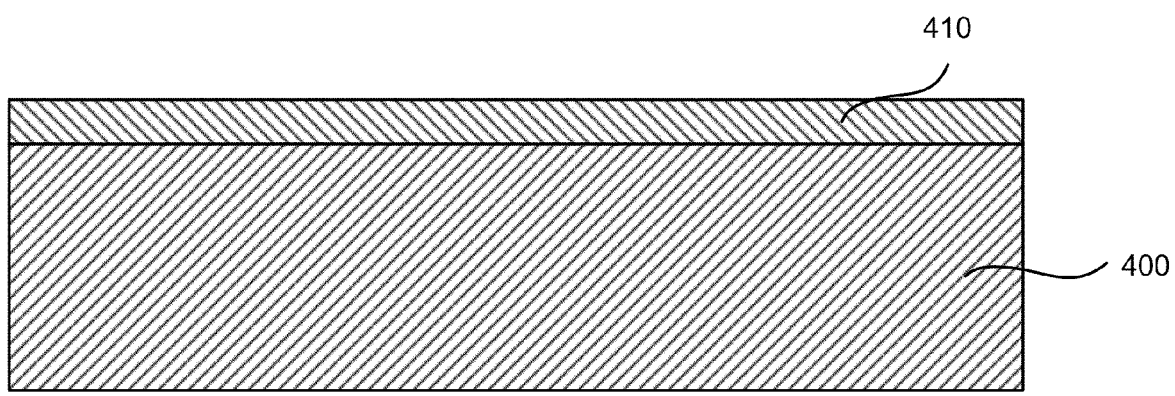
FIG. 4 shows a front sectional view of a diffuser membrane with an antistatic coating in accordance with an illustrative embodiment of the invention.

The present invention will be described with reference to illustrative embodiments. For this reason, numerous modifications can be made to these embodiments and the results will still come within the scope of the invention. No limitations with respect to the specific embodiments described herein are intended or should be inferred.

As indicated earlier, embodiments in accordance with aspects of the invention act to improve the aeration efficiency and contamination resistance of diffuser membranes by reducing the capacity of the diffuser membranes to buildup static electricity. Such a modification is informed by at least two observations. Firstly pressurized, dry air passing through the perforations of a diffuser membrane has a tendency to impart an electrostatic charge to the diffuser membrane by the triboelectric effect. Second, the pressurized air itself tends to accumulate charged particles by electrostatic interactions with non-conductive parts of the aeration system as it travels towards the diffuser membrane. When these charged particles finally reach the perforations in the diffuser membrane, they too can be transferred to the membrane.

Once so formed, this electrostatic charge (i.e., static charge) can have several disadvantageous effects. It may, for example, interact with the formation of bubbles, which typically carry a charge at their gas-liquid interfaces. Where there is an electrical attraction, this interaction causes the bubbles to reside at the perforations for a prolonged period of time before being released into the wastewater. Bubble size increases, and, ultimately, gas transfer efficiency is reduced. In addition, electrostatic charge on the diffuser membrane may attract charged particle or colloids residing in the wastewater. This, in turn, encourages fouling and scaling on the diffuser membrane. Such a mechanism may have a substantial impact on, for example, the precipitation of calcium and ferric salts.

Notably, such electrical effects are not widely recognized in the wastewater treatment art. The conventional wisdom in the diffuser industry has been that a diffuser membrane's surface tension (i.e. hydrophobicity or hydrophilicity) is solely responsible for the amount of time required for the bubble to be released at the air/water interface. Hence the industry has gravitated towards hydrophobic diffuser membranes without considering the effects of static charge. Likewise, the vast majority of research papers do not attribute the rate of contamination to electrical effects.

Flexible diffuser membranes in accordance with aspects of the invention are preferably formed at least in part by conventional compression molding techniques. Compression molding is a widely used process for forming rubber components and is described in numerous references including, for example, D. V. Rosato et al., *Injection Molding Handbook* (*Third Edition*) (Springer, 2000), which is hereby incorporated by reference herein. FIG. 2 shows an exemplary process sequence 200 for compression molding and perforating a diffuser membrane. In a first step 210, the diffuser material is mixed and preheated. In a second step 220, the diffuser material is placed into an open heated mold cavity. In a third step 230, the mold is closed and pressure is applied to force the diffuser material into contact with all the mold areas. Subsequently, in a fourth step 240, heat and pressure are maintained on the diffuser material until it is fully cured. Lastly, in a fifth step 250, the molded diffuser membrane is removed from the mold and perforated with needles or knives to produce round, star-shaped, or slit-shaped perforations.

Compression molding is preferred over injection molding because compression molding tends to create parts with even specific gravities and uniform tear resistances. The diffuser membranes may comprise, for example, ethylene-propylene-diene-monomer (EPDM) rubber, polyurethane rubber, silicone rubber, nitrile butadiene rubber, or any other suitable material.

In a first illustrative embodiment of the invention, the capacity of the diffuser membrane to buildup static charge is substantially reduced by adding an antistatic agent to the diffuser membrane. In this particular embodiment, the antistatic additive is added to the bulk of the diffuser membrane in step 210 of the compression molding process 200. The antistatic additive is itself conductive or imparts additional conductivity to the diffuser material (e.g., EPDM rubber). With the addition of these antistatic additives, charge induced on the diffuser membrane by the triboelectric effect or transferred from the pressurized air is dissipated before it can have any adverse effects.

Suitable antistatic additives for use in the bulk of the diffuser membrane include, but are not limited to: long-chain aliphatic amines and amides, phosphate esters, quaternary ammonium salts, polyethylene glycols, polyethylene glycol esters, non-ionic surfactants, phosphoric acid esters, polyoxyalkylate glycol esters, ethylene oxide condensates, and ethoxylated long-chained aliphatic amines. Indium tin oxide and conductive polymers are additional options. Such additives are commercially available. For example, Joong I1 Oil Chemical Co., Ltd. (Kyungnam, Korea) makes an antistatic additive called JISTAT 500S that is suitable for inclusion in EPDM rubber products. Joong I1 also makes JISTAT 1000, which is suitable for silicone and nitrile butadiene rubber products, and JISTAT 2000, which is suitable for polyurethane rubber products. In each case, the JISTAT product is a liquid that can be added to the diffuser material prior to compression molding. JISTAT additives in the 5-7 weight-percent concentration are, for example, able to instill EPDM, polyurethane, silicone, and nitrile butadiene rubber products with sheet resistances between about $10^6$ and about $10^7$ ohms per square. The capability of these products to buildup static charge is thereby substantially diminished over what it would be without the additives.

Other suitable antistatic additives are described in J. Pionteck et al., *Handbook of Antistatics* (ChemTec Publishing, 2007), which is hereby incorporated by reference herein. Notably, the use of an antistatic additive in the bulk of the diffuser membrane not only reduces the ability of the upper surface of the diffuser membrane to buildup static charge, but also reduces the ability of the sidewalls of the perforations to buildup such charge. Typically, static charge at the sidewalls of the perforations has the greatest impact on bubble formation and adverse contamination effects (e.g., head loss).

In a second illustrative embodiment of the invention, an antistatic agent is again utilized to diminish the capacity of a diffuser membrane to buildup static charge, but, in this instance, is in the form of an antistatic coating rather than a bulk additive. FIG. 3 shows a block diagram of a process 200' for forming a diffuser membrane with such a coating. As indicated in the figure, the diffuser membrane is initially compression molded and perforated using a process similar to the process 200 described above. However, after injection molding and perforation, an antistatic coating is applied to the top surface of the diffuser membrane in a step 260.

Optionally, the antistatic coating may also be applied to the sidewalls of the perforations and/or the backside of the diffuser membrane as well as the top surface. Depending on the antistatic coating, the antistatic coating may be applied to the diffuser membrane, for example, as a liquid or paste, and allowed to dry in place. Heat and/or pressure may optionally be used to aid in the coating process. Moreover, the diffuser membrane surface may optionally be roughened prior to applying the antistatic coating and/or an additional primer layer may be inserted between the diffuser membrane and antistatic coating to improve adhesion.

The antistatic coating may be applied in its pure form or as a dispersion. Suitable antistatic coatings for diffuser membranes include, for example, KE-969-OU and KE-569-OU available from ShinEtsu Chemical Co, Ltd. (Tokyo, Japan), as well as some of the materials mentioned above with respect to antistatic additives. FIG. 4 shows a front sectional view of a diffuser membrane 400 with an added antistatic coating 410 on its upper surface.

It should again be emphasized that the above-described embodiments of the invention are intended to be illustrative only. Other embodiments can use different types and arrangements of elements for implementing the described functionality. In some embodiments, for example, the diffuser membrane may be tubular or rectangular panel shaped (i.e., shaped like a strip). What is more, other embodiments may comprise, as just another example, a diffuser membrane with a combination of the above-described features (e.g., a diffuser membrane with both an antistatic additive and an antistatic coating). These numerous alternative embodiments within the scope of the appended claims will be apparent to one skilled in the art.

Moreover, all the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

What is claimed is:

1. A diffuser membrane for use in a wastewater treatment application, the diffuser membrane comprising an additive or a coating operative to substantially reduce the ability of at least a portion of the diffuser membrane to buildup static charge.

2. The diffuser membrane of claim 1, wherein the diffuser membrane comprises a fine bubble diffuser membrane.

3. The diffuser membrane of claim 1, wherein the diffuser membrane defines a plurality of perforations.

4. The diffuser membrane of claim 2, wherein the additive or the coating is operative to substantially reduce the ability of the sidewalls of the plurality of perforations to buildup static charge.

5. The diffuser membrane of claim 2, wherein each of the plurality of perforations comprises a respective substantially round or substantially star-shaped hole.

6. The diffuser membrane of claim 2, wherein each of the plurality of perforations comprises a respective substantially slit-shaped opening.

7. The diffuser membrane of claim 1, wherein the diffuser membrane comprises at least one of ethylene-propylene-diene-monomer rubber, polyurethane rubber, and silicone rubber.

8. The diffuser membrane of claim 1, wherein the diffuser membrane is substantially shaped like a tube, strip, or disc.

9. The diffuser membrane of claim 1, wherein the diffuser membrane is coated with a coating comprising a fluoroelastomer.

10. The diffuser membrane of claim 1, wherein the diffuser membrane is coated with a coating comprising polytetrafluoroethylene.

11. The diffuser membrane of claim 1, wherein the diffuser membrane is exposed to a gas comprising fluorine.

12. The diffuser membrane of claim 1, wherein the additive or the coating comprises at least one of a long-chain aliphatic amine, a long-chain aliphatic amide, a phosphate ester, a quaternary ammonium salt, a polyethylene glycol, a polyethylene glycol ester, a non-ionic surfactant, a phosphoric acid ester, a polyoxyalkylate glycol ester, an ethylene oxide condensate, an ethoxylated long-chained aliphatic amine, indium tin oxide, and a conductive polymer.

13. The diffuser membrane of claim 1, wherein the diffuser membrane comprises both an additive and a coating operative to substantially reduce the ability of at least a portion of the diffuser membrane to buildup static charge.

* * * * *